United States Patent [19]

Scaduto et al.

[11] Patent Number: 4,557,502
[45] Date of Patent: Dec. 10, 1985

[54] ROLL BAR RETRACTING MECHANISM FOR CONVERTIBLES

[76] Inventors: Onofrio Scaduto; Domenico Scaduto, both of 918 Dale Ct., San Marcos, Calif. 92069

[21] Appl. No.: 548,973

[22] Filed: Nov. 7, 1983

[51] Int. Cl.[4] .............................. B60R 21/02; B60J 724
[52] U.S. Cl. ..................................... 280/756; 296/109; 296/186; 414/914
[58] Field of Search .................. 280/756; 296/27, 107, 296/109, 147, 150, 185, 186, 216, 219; 414/914

[56] References Cited

U.S. PATENT DOCUMENTS

| | | | |
|---|---|---|---|
| 1,291,496 | 1/1919 | Hardie | 280/756 |
| 3,259,211 | 7/1966 | Ryskamp | 187/9 R |
| 3,292,726 | 12/1966 | Jette, Jr. | 280/801 |
| 3,494,659 | 2/1970 | Trenkler | 296/107 |
| 3,508,785 | 4/1970 | Chang | 296/76 |
| 3,526,428 | 9/1970 | Porsche et al. | 296/146 |
| 3,912,297 | 10/1975 | Mitsuishi et al. | 280/756 |
| 4,089,542 | 5/1978 | Westerman | 280/639 |
| 4,165,122 | 8/1979 | Bertone | 296/216 |
| 4,286,821 | 9/1981 | Cooper | 296/216 |

FOREIGN PATENT DOCUMENTS 107763  11/1924  Switzerland ................. 296/109

Primary Examiner—Joseph F. Peters, Jr.
Assistant Examiner—Kenneth R. Rice
Attorney, Agent, or Firm—Baker, Maxham, Callan & Jester

[57] ABSTRACT

A roll bar for convertible-type vehicles includes a generally U-shaped inverted roll bar structure pivotally mounted to an automobile chassis for extending across and above the passenger compartment when in the up position and pivotally mounted to pivot to a downward generally horizontal retracted position. The roll bar is mounted to pivot generally about a support bar that is mounted within and extends to each side of the chassis and includes a fixed gear on the mounting bar and a driving gear carried by the roll bar in driving engagement with the fixed gear with a curved guide slot disposed adjacent the drive mechanism for guiding the roll bar into the respective vertical and horizontal positions.

16 Claims, 9 Drawing Figures

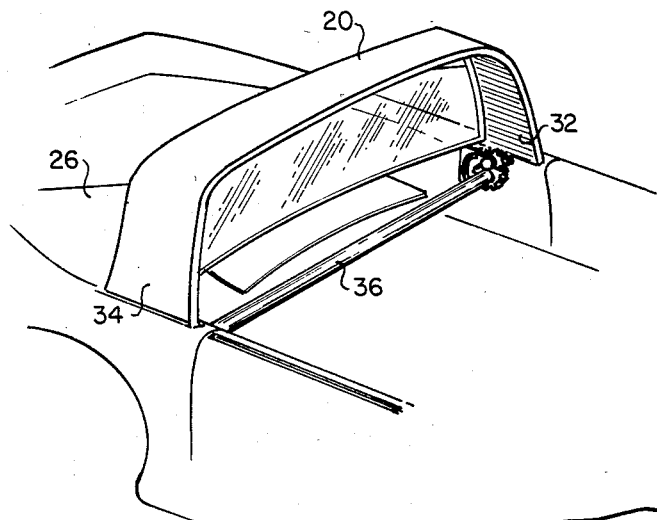
FIG. 5
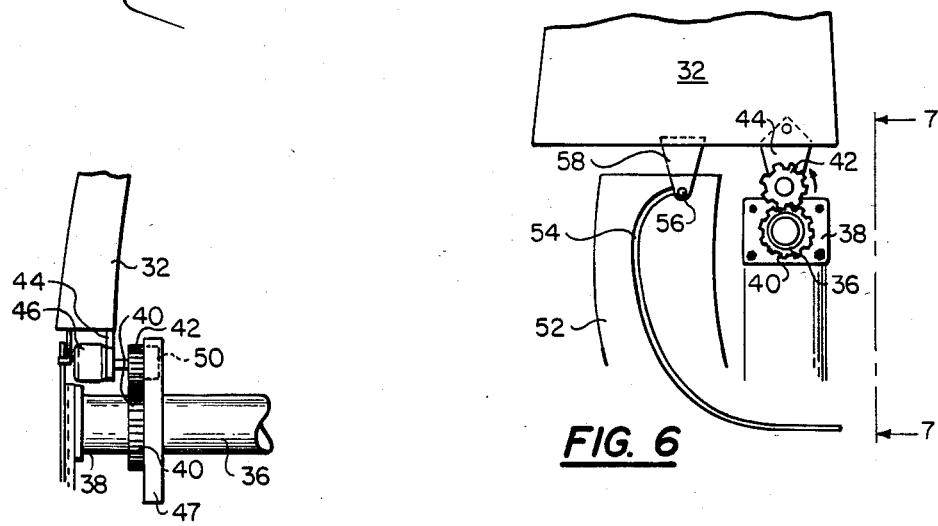
FIG. 6
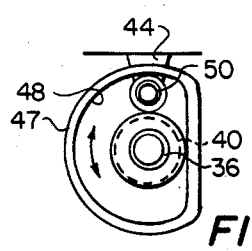
FIG. 7
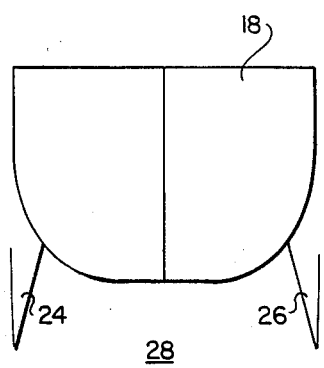
FIG. 8
FIG. 9

ROLL BAR RETRACTING MECHANISM FOR CONVERTIBLES

BACKGROUND OF THE INVENTION

The present invention relates to roll bars for automobiles and pertains particularly to a retractable roll bar assembly.

Many modern day sport cars, particularly of the two-seater configuration, have a roll bar that extends across the passenger compartment just behind the seat structure for safety reasons. Such sport car vehicles typically have a removable top which provides an open top open-air configuration somewhat simulating the convertible. Many such vehicles are not true top down convertibles. Such vehicles typically have the roll bar built into the structure to provide a pleasing appearance when the top is in place but giving an appearance that is less than desirable when the top has been removed.

Many prefer the fully top down convertible-like configuration for such automobiles. It is also desirable to retain the roll bar structure for safety reasons and for supporting the removable hard top when in place.

In order to fully provide the true convertible configuration it is desirable to remove or eliminate the upwardly extending roll bar when the vehicle is in the top down convertible configuration.

It is therefore desirable that a retractable roll bar be available which moves between vertical and horizontal positions to provide a truly convertible appearance.

SUMMARY AND OBJECTS OF THE INVENTION

It is therefore the primary object of the present invention to provide an improved retractable roll bar for an automotive vehicle.

In accordance with the primary aspect of the present invention, a roll bar is pivotally mounted in the chassis of a vehicle for extending between a vertical protective position behind the passenger's seat to a generally horizontal retractable position.

BRIEF DESCRIPTION OF THE DRAWINGS

The above and other objects and advantages of the present invention will become apparent from the following description when read in conjunction with the drawings wherein:

FIG. 5 is a perspective view showing details of the roll bar assembly;

FIG. 6 is an enlarged detail view showing the details of the roll bar drive and guide assembly;

FIG. 7 is a view taken generally along lines 7—7 of FIG. 6; and

FIG. 8 is a detailed side elevation view of the pinion guide assembly of FIG. 7; and, FIG. 9 is a top plan view of the vehicle top.

DETAILED DESCRIPTION OF A PREFERRED EMBODIMENT

Figure 1:
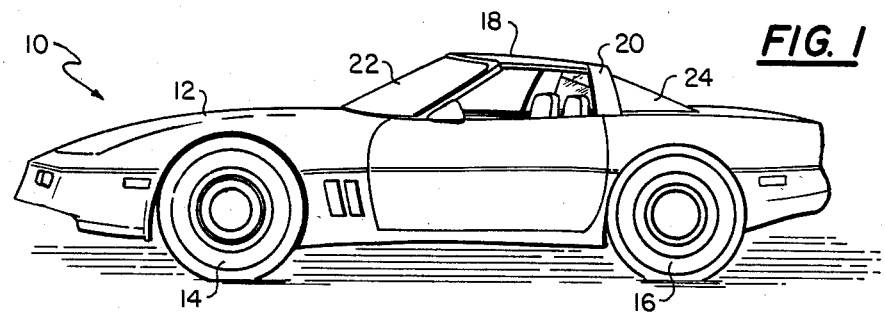
FIG. 1 is a side elevation view of a typical removable top sports car incorporating a preferred embodiment of the present invention.

Referring to FIG. 1, there is illustrated a typical two-seater sports car. The illustration is that of the 1984 Chevrolet Corvette. The vehicle designated generally by the numeral 10 includes a chassis 12 supported on the usual pairs of front and rear wheels 14 and 16.

The illustrated vehicle incorporates an embodiment of the invention yet retains its original appearance when in the top on roll bar up configuration.

Figure 2:
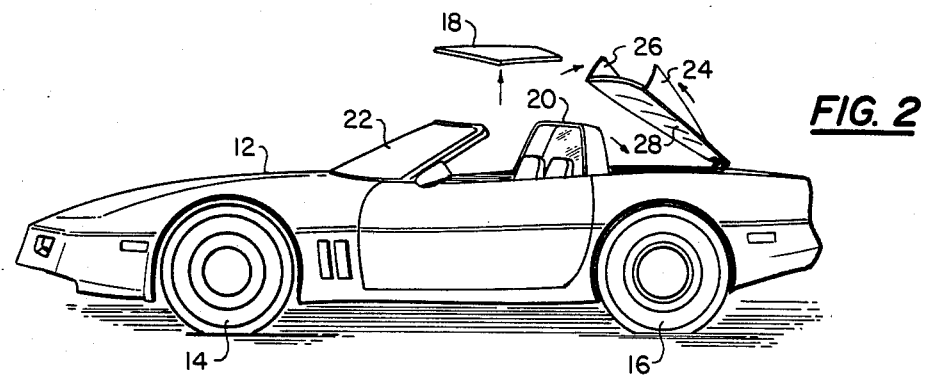
FIG. 2 is a view like FIG. 1 illustrating the first stages of removal of the top and retraction of the roll bar.
Figure 3:
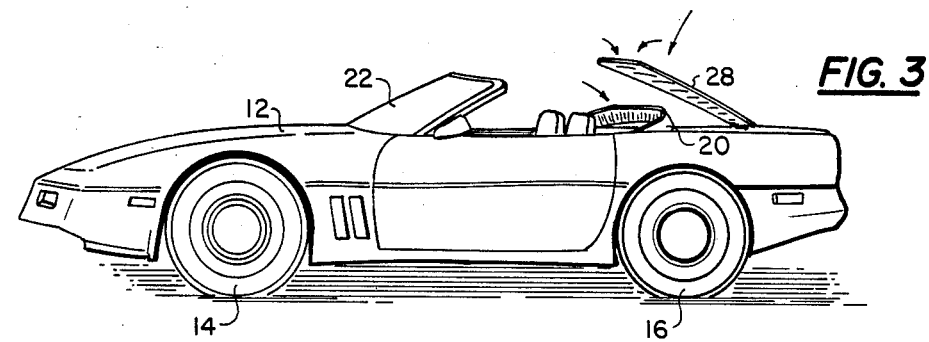
FIG. 3 is a view like FIG. 2 illustrating a progressive stage of the roll bar retraction.
Figure 4:
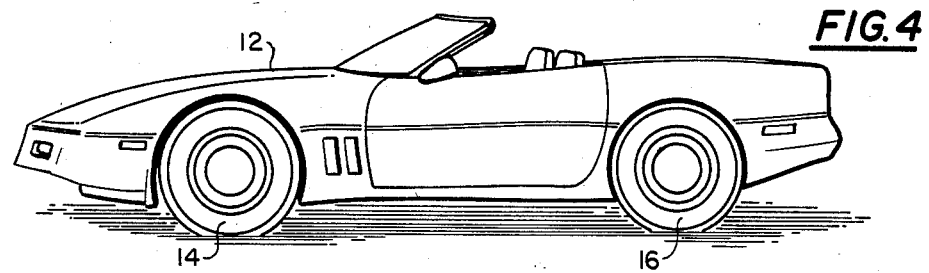
FIG. 4 is a view like FIG. 2 showing the top removed and roll bar fully retracted.

The vehicle includes a removable top 18 that is supported between a roll bar 20 and the support structure of the windshield 22. A pair of wings 24 and 26 extend upward from the rear deck 28 which in the illustrated embodiment is hinged at the back to lift or pivot upward as illustrated in FIG. 2 to permit the roll bar 20 to pivot backward as shown in FIG. 3 to a fully retracted position to permit the back deck to fold down or completely close to provide a top down convertible configuration, as illustrated in FIG. 4.

The deck has been modified in the illustrated embodiment to provide foldable wings 24 and 26 which fold over onto and closely fit the top deck to blend into the deck upon folding down. Alternatively, the wings 24 and 26 could fold underneath the deck 28 to provide a clean finished deck, if desired.

The top 18 in a preferred embodiment as best illustrated in FIG. 9 is hinged along a center line or hinge line 30 such that the top can be easily folded and stowed in the compartment behind the seats and below the rear deck 28.

Referring now to FIG. 5, a perspective view of the roll bar assembly is illustrated with the view being a perspective view from the upper right toward the lower left rear into the passenger compartment with the seat and similar structure omitted to provide a view of the roll bar mounting structure. The roll bar 18 has a generally inverted U-shaped configuration with side leg portions 32 and 34 extending downward from the elongated upper or top portions thereof to a pivotal mounting assembly which includes a main support bar 36.

The main support bar 36 is mounted in a suitable manner such as by means of a bracket or the like 38 at each end thereof, only one of which is shown in FIG. 6 securing the support bar 36 directly to the side wall panel on the interior of the vehicle body or chassis behind the driver and passenger seat directly below the normal positioning for the roll bar. This provides a convenient, secure support structure for the roll bar mounting support assembly. The support bar 36 may have any suitable configuration such as cylindrical, as shown, or it may be square, rectangular, or any other configuration. Mounted on each end of the support bar 36, again only one of which is shown, is a fixed central stationary gear 40 which, as shown, is concentric with the support bar 36 and in the illustrated embodiment extends completely around the bar 36. The gear is spaced inward from the bracket 38 and is engaged by a planetary pinion gear 42 which meshes with the fixed gear 40 and drivingly engages therewith.

The planetary pinion gear 42 is rotatably mounted in a lower bracket 44 of the leg 32 of the roll bar and in the illustrated embodiment is driven by an electric motor 46. The gear can, of course, be driven by other means such as hydraulic motors or by a hand crank. The motor 46 and planetary pinion gear 42 is mounted on the bracket 38 carried with the roll bar. Because the roll bar must have, in certain instances, certain different instantaneous centers of rotation, as will be explained, the roll bar itself is mounted to rotate about the axis of the planetary pinion gear 42 and its drive shaft.

The pinion gear 42 is held in meshing engagement with the fixed gear 40 by means of a guide channel or plate 47 having a guide slot 48 formed therein and extending in an arc around the axis of the support bar 36. The guide channel or bracket 47 is engaged by a follower 50 mounted on the gear 42 or shaft therefore for engaging the channel or slot 48 and guiding the pinion gear 42 in an arc about the fixed gear 40 while, at the same time, maintaining the gear in driving engagement with the fixed central gear 40.

For certain vehicles, particularly the Corvette, the positioning of the support and the shape, size of the roll bar as well as the space within the compartment of the rear deck, the roll bar must be guided such that the forward end swings around and drops downward at the retracted position thereof. For this reason, the roll bar is provided with an axis of rotation about the shaft 36 about the pinion gear 42 and with guidance from a guide assembly including a plate 52 having an arcuate guide channel or slot 54 therein. The guide plate 52 is attached such as to the side walls of the vehicle or to suitable support bracket therein spaced in the illustrated embodiment behind the drive mechanism and the support bar 36. A follower pin 56 on a bracket 58 extending downward from the bottom of the legs 32 and 34 of the roll bar engage the slot 54 for guiding the roll bar to its retracted position.

The roll bar swings down to a generally horizontal position at which point the drive continues to bring the legs 32 and 34 of the roll bar down below or down sufficiently below the side walls of the rear compartment to permit closing of the rear deck 28. The retracting drive and guide mechanism then provides a complex motion of the lower end of the roll bar to retract the bar and position it in a retracted position out of the way of the rear deck. Certain automobiles can accommodate a roll bar modification that does not require the complicated guide arrangement. However, certain automobiles, including the Corvette, require this certain modification thereof. Stop or limit switches may be provided at the ends of travel of the roll bar to stop the drive mechanism as the roll bar reaches its upper most position and as it reaches its lower most position.

While I have illustrated and described my invention by means of specific embodiments, it is to be understood that numerous changes and modifications may be made therein without departing from the spirit and scope of the invention as defined in the appended claims.

What is claimed is:

1. A retractable roll bar assembly for an automotive vehicle, comprising:
   mounting means for securing to a vehicle chassis and for pivotally mounting a roll bar;
   a generally U-shaped roll bar for pivotally mounting in an inverted position to said mounting means for spanning the passenger compartment of an automobile, and pivoting between a vertical protective position and a generally horizontal retracted position behind the passenger compartment; and
   drive means includes a first gear fixed on said mounting means and a second gear rotatably mounted on said roll bar and drivingly engaging said fixed gear for pivoting said roll bar between said vertical and horizontal positions.

2. The roll bar assembly of claim 1 including a guide slot mounted on said chassis, and
   guide pin means mounted on said roll bar for engaging said guide slot for guiding said roll bar between said vertical and said horizontal position.

3. The roll bar assembly of claim 1 wherein said second gear travels in an arc about said first gear.

4. The roll bar assembly of claim 3 including guide means for guiding said second gear in said arc about said first gear.

5. The roll bar assembly of claim 4 pivots about first and second axes.

6. The roll bar assembly of claim 5 wherein said mounting means comprises a bar extending horizontally between the sides of said vehicle chassis;
   said first axis coincides with the axis of said bar; and
   said second axis coincides with the axis of said second gear.

7. The roll bar assembly of claim 6 wherein said second gear is driven by a motor.

8. The roll bar assembly of claim 1 wherein said vehicle chassis includes a removable hard top supported between said roll bar and a windshield frame for said chassis; and
   said removable hard top is foldable for easy storage.

9. The roll bar assembly of claim 8 wherein said vehicle chassis includes a generally horizontal rear deck lid opening to provide access to a space behind the seat of said vehicle,
   and said roll bar pivots into said space beneath said rear deck.

10. The roll bar assembly of claim 9 wherein said rear deck includes side wings foldable to a flat position, on top of said deck when said roll bar is retracted and extendable to an upper position extending the side profile lines of the vehicle from said deck to the top of said roll bar when said roll bar is in the upper position.

11. The roll bar assembly of claim 10 wherein said rear deck lid is hinged at the back edge thereof to said chassis.

12. A retractable roll bar assembly for an automobile vehicle, comprising:
   a mounting bar for securing in a generally horizontal position between the sides of a vehicle chassis for pivotally mounting a roll bar;
   a generally U-shaped roll bar pivotally mounted on said mounting bar and extending across and above the passenger compartment of said vehicle chassis, said roll bar being pivotal between a vertical protective position and a generally horizontal retracted position behind the passenger compartment.

13. The roll bar assembly of claim 12 including a first gear fixed on each end of said mounting bar and a pinion gear rotatably mounted on said roll bar and drivingly engaging said fixed gear; and
   drive means for driving said pinion gear for moving said roll bar between the vertical protective position and the horizontal retracted position.

14. The roll bar assembly of claim 13 wherein said roll bar is pivotal about a first axis coinciding with the axis of said fixed gear and pivotal about a second axis coincided with the axis of said pinion gear;
   first guide means for guiding said pinion gear in an arc about said fixed gear; and
   second guide means for guiding said roll bar during pivotal movement between said vertical said protected position and said horizontal retracted position.

15. The roll bar assembly of claim 14 wherein said first guide means comprises an arcuate guide slot curved about said support bar and a guide roller mounted coaxial of said pinion gear and engaging said guide slot.

16. The roll bar assembly of claim 15 wherein said second guide means includes a arcuate guide slot disposed adjacent said fixed gear and fixed to said chassis and a guide pin mounted on said roll bar and engageable with said guide slot.

* * * * *